(12) United States Patent
Wu et al.

(10) Patent No.: US 9,505,854 B2
(45) Date of Patent: Nov. 29, 2016

(54) ELASTOMERIC MATERIAL, COLOR FILTER SUBSTRATE AND LIQUID CRYSTAL PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Juan Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 36 days.

(21) Appl. No.: 14/526,786

(22) Filed: Oct. 29, 2014

(65) Prior Publication Data
US 2015/0331162 A1    Nov. 19, 2015

(30) Foreign Application Priority Data

May 13, 2014 (CN) .......................... 2014 1 0200383

(51) Int. Cl.
C09K 19/00 (2006.01)
C08F 2/48 (2006.01)
(Continued)

(52) U.S. Cl.
CPC .............. *C08F 2/48* (2013.01); *C08F 283/12* (2013.01); *C08F 283/128* (2013.01);
(Continued)

(58) Field of Classification Search
CPC .................. Y10T 428/1059; Y10T 428/1068; G02F 1/133514; G02F 2001/133519; G02F 2202/022; G02B 5/20; G02B 5/201; C09D 183/04

USPC ................ 428/1.5, 1.52; 349/106, 153, 190; 359/891; 524/588; 445/25
See application file for complete search history.

(56) References Cited

U.S. PATENT DOCUMENTS

2005/0128420 A1* 6/2005 Seok ................... G02F 1/13394
                                                                349/153
2009/0251649 A1* 10/2009 Kim ...................... G02F 1/1339
                                                                349/110

FOREIGN PATENT DOCUMENTS

CN    101566755 A    10/2009
CN    102643387 A    8/2012
(Continued)

OTHER PUBLICATIONS

The First Office Action dated Feb. 2, 2016 corresponding to Chinese application No. 201410200383.7.

*Primary Examiner* — Ruiyun Zhang
(74) *Attorney, Agent, or Firm* — Nath, Goldberg & Meyer; Joshua B. Goldberg

(57) ABSTRACT

An elastomeric material, a color filter substrate and a liquid crystal panel are disclosed. The elastomeric material is prepared by subjecting a mixture of a siloxane side-chain liquid crystal elastomer, a polymerizable liquid crystalline monomer and a photoinitiator to UV irradiation to induce polymerization. The color filter substrate comprises a sealant and a pixel area, with a retaining ring disposed therebetween, wherein the retaining ring is prepared from the siloxane side-chain liquid crystal elastomer or the elastomeric material. The liquid crystal panel is prepared by assembling and aligning, under vacuum, an array substrate and the color filter substrate. By applying a ring of the elastomeric material having a network structure between the sealant and the pixel area according to the invention, it is possible to effectively prevent the impact of liquid crystal on the sealant during cell assembly and alignment, such that the undesirable phenomenon like penetration is minimized.

17 Claims, 3 Drawing Sheets

(51) Int. Cl.
*G02B 5/20* (2006.01)
*C09D 183/04* (2006.01)
*C09J 183/04* (2006.01)
*G02F 1/1335* (2006.01)
*C08F 283/12* (2006.01)
*C09K 19/40* (2006.01)

(52) U.S. Cl.
CPC .......... *C09D 183/04* (2013.01); *C09J 183/04* (2013.01); *C09K 19/408* (2013.01); *G02B 5/201* (2013.01); *G02F 1/1335* (2013.01); *G02F 1/133514* (2013.01); *Y10T 428/1059* (2015.01); *Y10T 428/1068* (2015.01)

(56) References Cited

FOREIGN PATENT DOCUMENTS

| | | |
|---|---|---|
| CN | 102643432 A | 8/2012 |
| CN | 102645777 A | 8/2012 |

\* cited by examiner

ELASTOMERIC MATERIAL, COLOR FILTER SUBSTRATE AND LIQUID CRYSTAL PANEL

FIELD OF THE INVENTION

The present invention relates to the technical field of the preparation of liquid crystal display panels. More particularly, the present invention relates to an elastomeric material, a color filter substrate prepared from the elastomeric material, and a liquid crystal panel comprising the color filter substrate.

BACKGROUND OF THE INVENTION

A liquid crystal display panel is prepared by assembling and aligning, under vacuum, an array substrate on which liquid crystal has been dropped and a color filter substrate coated with an adhesive (which is also referred to as sealant). FIG. 1 shows the schematic view of the construction of a typical liquid crystal display panel, which comprises a pixel area 1, an alignment layer 2, a sealant 3, a color filter black matrix 4 and a glass substrate 5. Currently, there are a variety of sealants commercially available in the markets. The main ingredients of the sealants include ultraviolet (UV) polymerizable monomers, heat-polymerizable epoxy monomers, epoxy acrylate resins, photoinitiators, heat curing agents, coupling agents, organic fillers, inorganic fillers, particulate additives, etc.

Conventional sealants are crosslinked stepwise by UV polymerization and heat polymerization. Before polymerization, the majority of the components of the sealants are comprised of small molecules. As shown in FIG. 2, during the alignment of a color filter substrate and an array substrate, the liquid crystal 3 disposed between two glass substrates 1 tends to exert impact on sealant 2, such that undesirable phenomenon like penetration occurs. The current attempts to solve this problem focus on improving of the properties of sealant materials.

The Chinese patent publication No. CN102643432A discloses a cholesteric siloxane side-chain liquid crystal polymer, which has the properties including a reversible cholesteric phase, a relatively wide range of liquid-crystal-phase temperature, and a relatively high helical twisting power. The properties of this side-chain liquid crystal polymer can be adjusted by modifying the length of carbon chain in the spacer group, and the grafting molar ratio of the crosslinking agent to the liquid crystal monomer. However, there is no report of application of such a polymer in display art or other fields up to now.

SUMMARY OF THE INVENTION

An object of the present invention is to provide an elastomeric material, a color filter substrate prepared from the elastomeric material, and a liquid crystal panel comprising the color filter substrate, so as to solve the problem of impact on a sealant caused by a liquid crystal. Through the improvement of the construction of the liquid crystal panel, the liquid crystal can be effectively prevented from contacting the sealant. Thus, the impact of the liquid crystal on the sealant can be avoided, and the undesirable phenomenon like penetration is minimized, and the quality of the liquid crystal display panel is improved.

The object is achieved by the following technical solutions of the present invention.

In one aspect, the present invention provides an elastomeric material which is prepared by subjecting a mixture of a siloxane side-chain liquid crystal elastomer, a polymerizable liquid crystalline monomer and a photoinitiator to UV irradiation to induce polymerization.

In another aspect, the present invention provides a color filter substrate comprising a sealant and a pixel area, with a retaining ring disposed therebetween, wherein the retaining ring is prepared from the siloxane side-chain liquid crystal elastomer or the present elastomeric material.

In yet another aspect, the present invention provides a liquid crystal panel prepared by assembling and aligning, under vacuum, an array substrate and the present color filter substrate.

BRIEF DESCRIPTION OF THE DRAWINGS

The invention may be more completely understood in consideration of the following detailed description of various embodiments of the invention with reference to the accompanying drawings, wherein.

Figure 1:
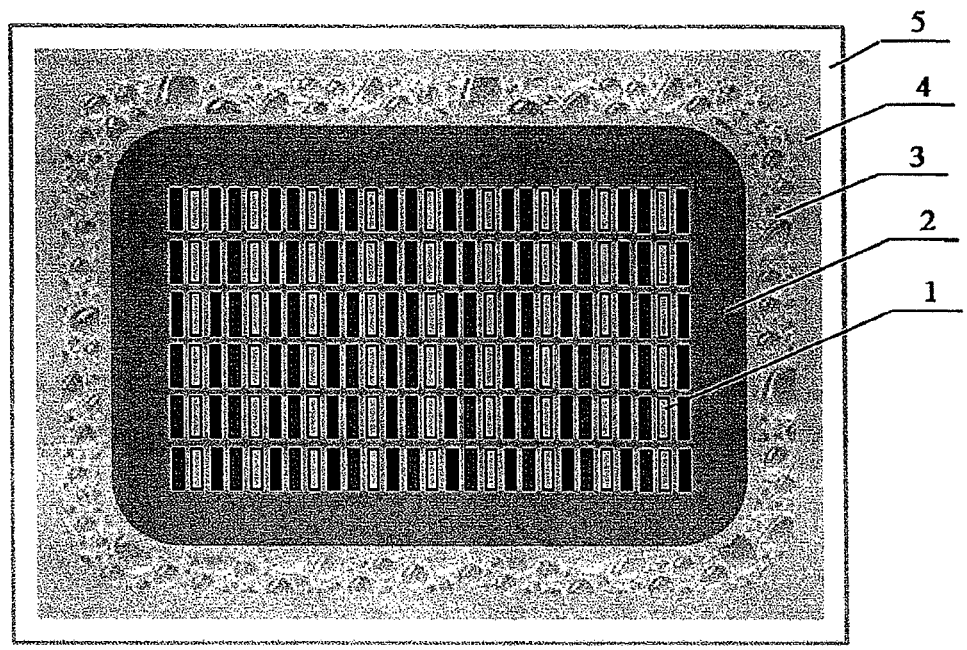
FIG. 1 is a schematic diagram showing the construction of a conventional color filter substrate.
Figure 2:
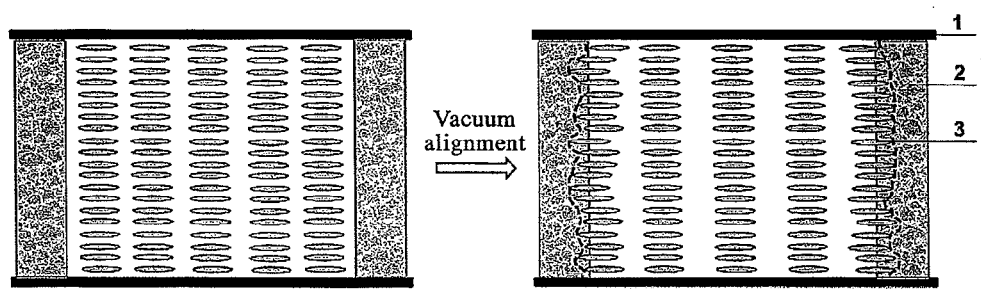
FIG. 2 is a schematic diagram showing a process of aligning of a conventional color filter substrate.

The invention is amenable to various modifications and alternative forms. Specifics thereof have been shown by way of example in the drawings. It should be understood, however, that it is not intended to limit the present invention to the particular embodiments described. On the contrary, the intention is to cover all modifications, equivalents, and alternatives falling within the spirit and scope of the present invention.

DETAILED DESCRIPTION OF CERTAIN EMBODIMENTS

To enable a person skilled in the art to have a better understanding of the technical solutions of the present invention, more detailed description of the invention will be given below with reference to the accompanying drawings and specific embodiments.

Herein, the recitation of a numerical range by endpoints (for example, "in the range of a to b", "between a and b", and analogous expressions) include the endpoints, as well as all the numbers and subsets within that range, for example, "in a range of 3 to 15" or "between 3 and 15" includes 3, 5, 7.5, 10, 15, 4-7.5, etc.

The present invention provides an elastomeric material which is prepared by subjecting a mixture of a siloxane side-chain liquid crystal elastomer, a polymerizable liquid crystalline monomer and a photoinitiator to UV irradiation to induce polymerization.

The siloxane side-chain liquid crystal elastomer refers to an elastomer comprising both a polysiloxane backbone and a liquid crystal unit-containing side chain. Such an elastomer typically has a crosslinked network structure. The polysiloxane backbone is preferably derived from poly(methyl hydrogen siloxane). The liquid crystal unit-containing side chain is preferably derived from a liquid crystalline monomeric cholesterol derivative. The crosslinked network structure is preferably formed in the presence of a binaphthol derivative as a crosslinker.

The siloxane side-chain liquid crystal elastomers suitable for the present invention include the liquid crystal elastomers disclosed in CN102643432A, which is incorporated herein by reference. The liquid crystal elastomer has a structure represented by the following formula:

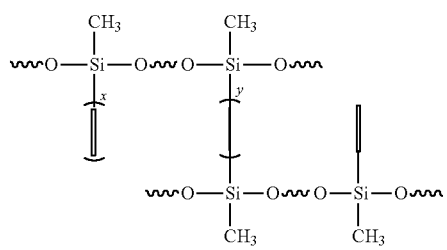

wherein:
— represents a crosslinker unit; and
═ represents a liquid crystalline monomeric unit.
— preferably represents:

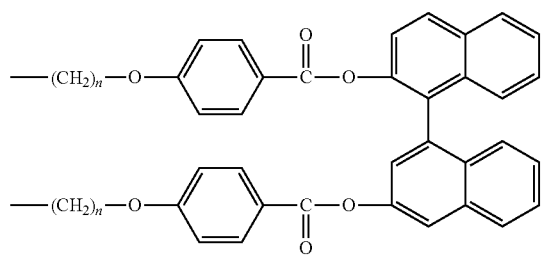

═ preferably represents:

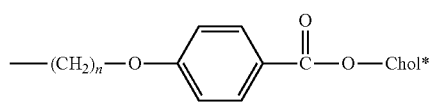

wherein:

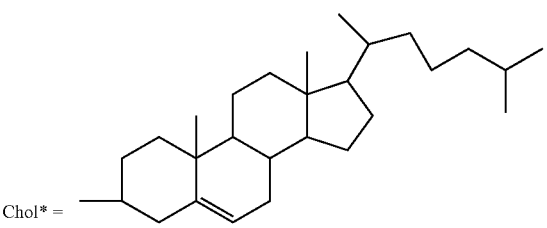 [SMILES: CC(C)CCCC(C)C1CCC2C3CC=C4CC(C)CCC4(C)C3CCC12C]

In the above formulae, n represents an integer in the range of 3-15, preferably 3-12, and more preferably 6-10; the ratio of x:y is in the range of 1:9-9:1, preferably 2:8-8:2, and more preferably 4:6-6:4.

The siloxane side-chain liquid crystal elastomer of the present invention may be prepared by grafting the liquid crystalline monomeric cholesterol derivative and the binaphthol derivative crosslinker to poly(methyl hydrogen siloxane) through a hydrosilylation reaction. The siloxane side-chain liquid crystal elastomer has a network structure and a crystalline nature, the respective polysiloxane backbone takes on a chain form and has a relatively high viscosity, and the binaphthol group in the crosslinker is rigid. Therefore, the alignment of small molecular liquid crystal will be anchored by the siloxane side-chain liquid crystal elastomer, and thus it is possible to prevent the impact of the liquid crystal on a sealant during cell assembly and alignment. While not wishing to be bound by theory, it is believed that due to the polymerizable liquid crystalline monomer comprised in the elastomeric material of the present invention, a larger network will be formed upon UV polymerization, besides the network of the siloxane side-chain liquid crystal elastomer itself. Since the former also has an anchoring action on the alignment of small molecules, the impact of liquid crystal molecules on a sealant can be prevented more effectively, and thus better performance is demonstrated.

The poly(methyl hydrogen siloxane) may have a structure represented by the following formula:

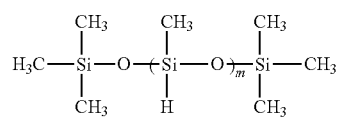

wherein m is an integer in the range of 4-30.

The liquid crystalline monomeric cholesterol derivative may have a structure represented by the following formula:

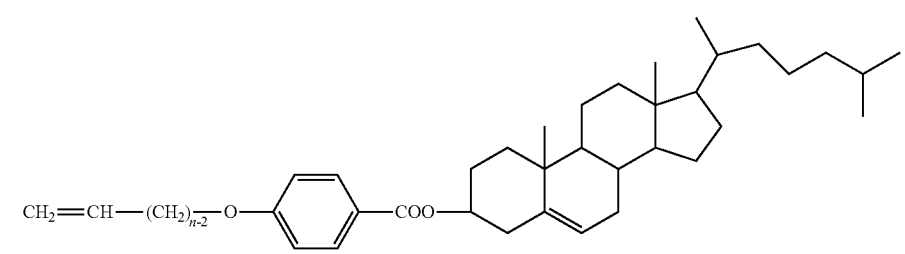

wherein n is an integer in the range of 3-15, preferably 3-12, and more preferably 6-10.

The binaphthol derivative crosslinker may have a structure represented by the following formula:

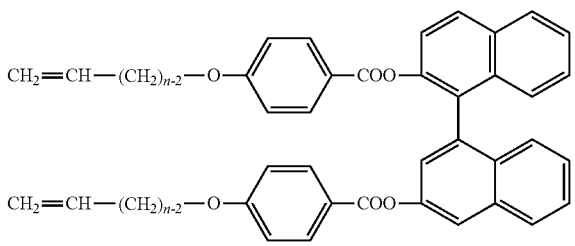

wherein n is an integer in the range of 3-15, preferably 3-12, and more preferably 6-10.

The polymerizable liquid crystalline monomers are commercially available or may be synthesized according to a process known in the art. The polymerizable liquid crystalline monomers suitable for the present invention include 1,4-bis(4-(6'-acryloxy hexyloxy)benzoyloxy)-2-toluene, as represented by the formula below:

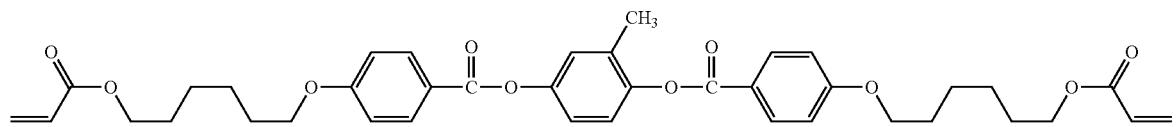

Typically, the photoinitiator is a UV photoinitiator. Examples of the UV photoinitiator include benzil dimethyl ketal, as represented by the formula below:

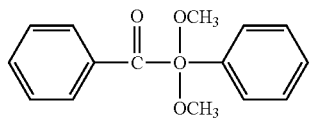

Preferably, the siloxane side-chain liquid crystal elastomer is present at an amount of 79% or more, the polymerizable liquid crystalline monomer is present at an amount of 20% or less, and the photoinitiator is present at an amount of 1% or less, based on the total mass of the siloxane side-chain liquid crystal elastomer, the polymerizable liquid crystalline monomer and the photoinitiator. In a preferable embodiment, the siloxane side-chain liquid crystal elastomer is present at an amount of 89-95%, the polymerizable liquid crystalline monomer is present at an amount of 5-10%, and the photoinitiator is present at an amount of 0.25-0.5%, based on the total mass of the siloxane side-chain liquid crystal elastomer, the polymerizable liquid crystalline monomer and the photoinitiator.

The elastomeric material may be prepared according to a conventional polymerization process in the art. In a particular embodiment, the siloxane side-chain liquid crystal elastomer is uniformly mixed with the polymerizable liquid crystalline monomer and the photoinitiator in a predetermined proportion, followed by UV irradiation and polymerization to form a compounded material of a polymeric network structure. Preferably, the irradiation intensity is in the range of 5-10 mW/cm$^2$, the temperature is in the range of 20-100° C., the duration of irradiation is in the range of 30-60 minutes (min). More preferably, the temperature is in the range of 20-40° C.

Figure 5:
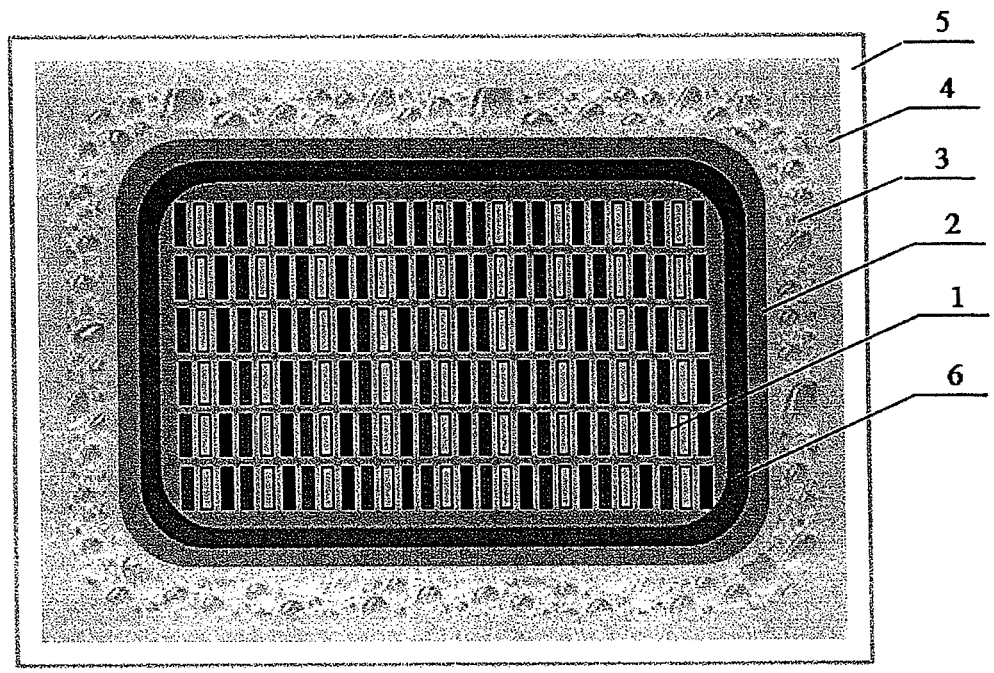
FIG. 5 is a schematic diagram showing the construction of a color filter substrate according to the present invention.

The present invention also provides a color filter substrate comprising a sealant and a pixel area, with a retaining ring disposed therebetween, wherein the retaining ring is prepared from the siloxane side-chain liquid crystal elastomer or the present elastomeric material. As shown in FIG. 5, the color filter substrate 5 includes a pixel area 1, an alignment layer 2, a sealant 3, a color filter black matrix 4, a glass substrate 5, and a retaining ring 6.

The width of the retaining ring is preferably in the range of 50 μm to 500 μm. If its width is less than 50 μm, the retaining ring is relatively narrow and the resistance to impact is relatively weak, and the liquid crystal molecules may penetrate through the retaining ring into the sealant. On the other hand, if the retaining ring has a width higher than 500 μm, the manufacturing cost is increased, and meanwhile, it is undesirable to the narrow-frame-design of liquid crystal panels. The width of the retaining ring is more preferably in the range of 200 μm-400 μm.

The sealant may be those commonly used in the art, such as UR-2920, S-WB42 and SUR-E709, commercially available from SEKISUI CHEMICAL CO., LTD.

According to the present invention, it is preferable that the retaining ring does not contact the sealant or the pixel area, but is separated therefrom by a certain distance. In order to avoid influence on the displaying performance of the pixel area and to ensure the bonding effect of the sealant, the distance of the inner edge of the retaining ring from the outer edge of the pixel area is in the range of 100-300 μm, and the distance of the outer edge of the retaining ring from the inner edge of the sealant is in the range of 50-200 μm, according to the present invention. However, the invention is not intended to be limited to the aforesaid numerical ranges, and the ranges can be determined depending on the final product as desired.

The thickness of the retaining ring is dependent on the cell thickness of the liquid crystal panel, and preferably is the range of 2.0 μm-6.0 μm. However, the invention is not intended to be limited to the aforesaid numerical range, and the range can be determined depending on the final product as desired.

As a preferable embodiment of the present invention, the retaining ring is prepared from the elastomeric material by the following process. The siloxane side-chain liquid crystal elastomer is uniformly mixed with the polymerizable liquid crystalline monomer and the photoinitiator. After deaeration away from light, the resultant mixture is uniformly coated onto a color filter substrate in a region between the pixel area and the sealant area. Upon UV irradiation, the retaining ring is formed.

Figure 3:
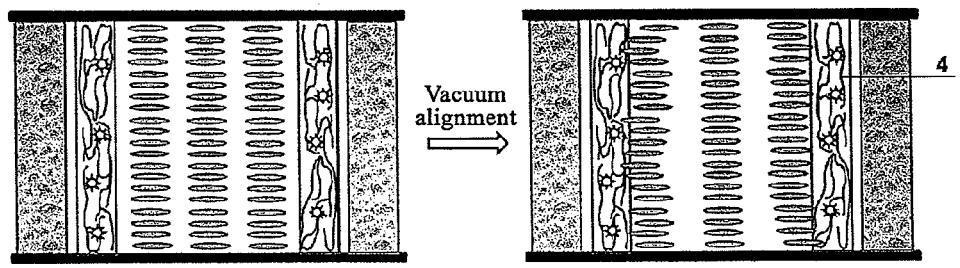
FIG. 3 is a schematic diagram showing a process of aligning of a liquid crystal panel according to the present invention.
Figure 4:
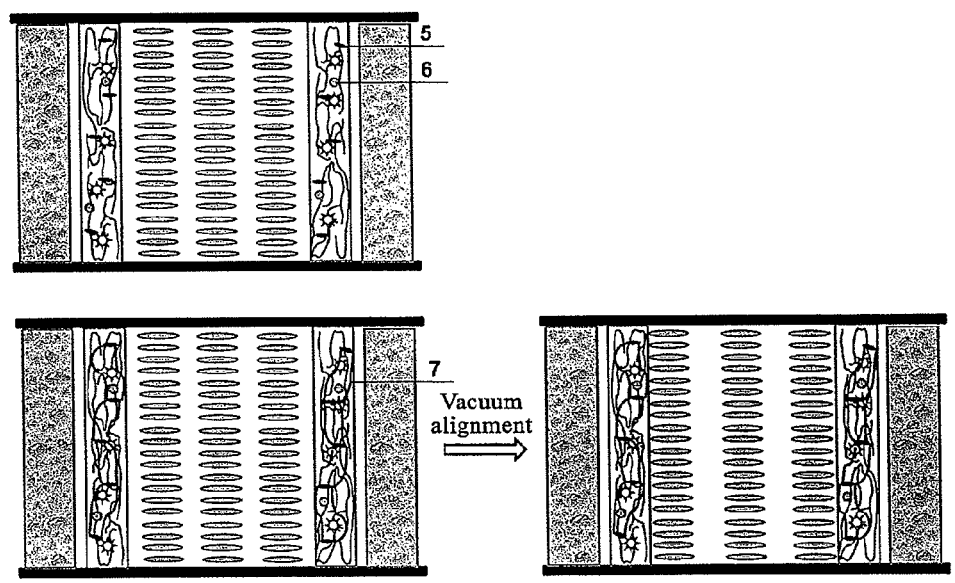
FIG. 4 is a schematic diagram showing another process of aligning of a liquid crystal panel according to the present invention.

As shown in FIGS. 3 and 4, a retaining ring 4 prepared from the elastomeric material is introduced between the pixel area and the sealant area on the color filter substrate. Thus, when the color filter substrate and the array substrate are assembled and aligned under vacuum, liquid crystal will firstly impact the elastomeric material. Since the elastomeric material can anchor the alignment of small molecular liquid crystal to prevent it from contacting the sealant, the impact of the liquid crystal on the sealant can be prevented. In particular, when the elastomeric material comprises a polymeric network structure 7 formed by polymerizing of the mixture of siloxane side-chain liquid crystal elastomer, polymerizable liquid crystalline monomer 5 and photoinitiator 6, the position of the siloxane side-chain liquid crystal elastomer can be further consolidated, and thus its impact resistance is enhanced.

The present invention also provides a liquid crystal panel which is prepared by assembling and aligning, under vacuum, an array substrate and the above-described color filter substrate.

According to the present invention, a retaining ring prepared from an elastomeric material is disposed between a pixel area and a sealant area on a color filter substrate, thereby the alignment of small molecular liquid crystal will be anchored. Thus, the liquid crystal can be prevented from contacting the sealant, and it is possible to effectively prevent the impact of the liquid crystal on a sealant during cell assembly and alignment, such that the undesirable phenomenon like penetration is minimized. In addition, since the material for preparation of the retaining ring has a relatively high viscosity, it is easy to from the retaining ring, while the width of the retaining ring can be controlled precisely. Such effect cannot be achieved when conventional materials are used.

EXAMPLES

The following examples are provided for illustrating the present invention, but the invention is not limited thereto.

Example 1

Preparation of a Liquid Crystal Panel (a) A 30% (w/w) siloxane side-chain liquid crystal elastomer in methylene chloride was deaerated for 3 hours (h) while being shielded from light, and then was uniformly coated onto a color filter substrate (available from DNP, Japan) in a region between pixel area and sealant area to form a retaining ring having a width of 300 μm and a thickness of 3 μm. The distance of the outer edge of the retaining ring from the inner edge of the sealant area is 50 μm, and the distance of the inner edge of the retaining ring from the outer edge of the pixel area is 100 μm. The siloxane side-chain liquid crystal elastomer was prepared by the process described in Example 2 of CN102643432A.

(b) A sealant (UR-2920, available from SEKISUI CHEMICAL CO., LTD) was deaerated for 2 h while being shielded from light, and then was uniformly applied to the sealant area of the color filter substrate obtained from step (a).

(c) An array substrate (CORNING glass used as the array substrate glass) having liquid crystal dropped thereon was assembled and aligned, under vacuum, with the color filter substrate obtained from step (b), thereby forming a liquid crystal panel.

Example 2

Preparation of a Liquid Crystal Panel

The liquid crystal panel was prepared by the process described in Example 1, except that the retaining ring had a width of 200 μm and a thickness of 4 μm. The distance of the outer edge of the retaining ring from the inner edge of the sealant area is 100 μm, and the distance of the inner edge of the retaining ring from the outer edge of the pixel area is 150 μm.

Example 3

Preparation of a Liquid Crystal Panel

The liquid crystal panel was prepared by the process described in Example 1, except that the retaining ring had a width of 400 μm and a thickness of 2 μm. The distance of the outer edge of the retaining ring from the inner edge of the sealant area is 100 μm, and the distance of the inner edge of the retaining ring from the outer edge of the pixel area is 100 μm.

Example 4

Preparation of a Liquid Crystal Panel (a) Preparation of an Elastomeric Material and a Retaining Ring A siloxane side-chain liquid crystal elastomer (prepared by the process described in Example 2 of CN102643432A), a polymerizable liquid crystalline monomer (1,4-bis(4-(6'-acryloxy hexyloxy)benzoyloxy)-2-toluene, see Broer D J, Boven J, Mol G N. In-situ photopolymerization of oriented liquid-crystalline acrylates, 3. oriented polymer networks from a mesogenic diacrylate. Die Makromolekulare Chemie, 1989, 190(9): 2255-2268), and photoinitiator 651 (available from TCI) were uniformly mixed in the mass proportion of 94.75:5:0.25. The resultant mixture was deaerated for 3 h while being shielded from light, and then was uniformly coated onto a color filter substrate (the same as that used in Example 1) in a region between pixel area and sealant area to form a retaining ring having a width of 300 μm and a thickness of 3 μm. The distance of the outer edge of the retaining ring from the inner edge of the sealant area is 50 μm, and the distance of the inner edge of the retaining ring from the outer edge of the pixel area is 100 μm.

The coated color filter substrate as described above was subjected to UV irradiation to induce crosslinking of the polymerizable liquid crystalline monomer, thereby forming an elastomeric material (i.e., retaining ring). The irradiation intensity was 5 mW/cm$^2$, the temperature was 25° C., and the duration of irradiation was 40 min.

(b) A sealant (UR-2920) was deaerated for 2 h while being shielded from light, and then was uniformly applied to the color filter substrate provided with a retaining ring.

(c) An array substrate (the same as that used in Example 1) having liquid crystal dropped thereon was assembled and aligned, under vacuum, with the color filter substrate obtained from step (b), thereby forming a liquid crystal panel.

Example 5

Preparation of a Liquid Crystal Panel

The liquid crystal panel was prepared by the process described in Example 4, except that the siloxane side-chain liquid crystal elastomer, the polymerizable liquid crystalline monomer and the photoinitiator were uniformly mixed in the mass proportion of 89.5:10:0.5. The resultant retaining ring had a width of 200 μm and a thickness of 4 μm. The distance of the outer edge of the retaining ring from the inner edge of the sealant area is 100 μm, and the distance of the inner edge of the retaining ring from the outer edge of the pixel area is 150 μm. The irradiation intensity was 10 mW/cm², the temperature was 40° C., and the duration of irradiation was 30 min.

Example 6

Preparation of a Liquid Crystal Panel

The liquid crystal panel was prepared by the process described in Example 4, except that the siloxane side-chain liquid crystal elastomer, the polymerizable liquid crystalline monomer and the photoinitiator were uniformly mixed in the mass proportion of 91.6:8:0.4. The resultant retaining ring had a width of 400 μm and a thickness of 2 μm. The distance of the outer edge of the retaining ring from the inner edge of the sealant area is 100 μm, and the distance of the inner edge of the retaining ring from the outer edge of the pixel area is 100 μm. The irradiation intensity was 5 mW/cm², the temperature was 30° C., and the duration of irradiation was 50 min.

Comparative Test on Penetration

Penetration test was conducted on the liquid crystal panels prepared in Examples 1-6 in comparison with a conventional liquid crystal panel without a retaining ring (Comparative Example 1). The penetration degree was observed, and the results are reported in Table 1 below.

The liquid crystal panel of Comparative Example 1 was prepared by the process described in Example 1, except that the elastomer material was not applied.

The penetration degree may be observed from the side of the array substrate by using a microscope. The larger the bright area within the sealant zone is, the heavier the penetration degree will be.

TABLE 1

Comparative test on penetration

| | Penetration width | The width that a retaining ring was impacted by liquid crystal towards sealant |
|---|---|---|
| Example 1 | No penetration observed | 20 μm |
| Example 2 | No penetration observed | 12 μm |
| Example 3 | No penetration observed | 15 μm |
| Example 4 | No penetration observed | 18 μm |
| Example 5 | No penetration observed | 10 μm |
| Example 6 | No penetration observed | 13 μm |
| Comparative Example 1 | 0.15 mm | — |

As can be seen from Table 1, the liquid crystal panels of Examples 1-6 each provided with a retaining ring can prevent the occurrence of penetration of liquid crystal. In contrast, in the case of the liquid crystal panel of Comparative Example 1 without a retaining ring, the sealant was severely impacted by liquid crystal during the process of cell assembly and alignment, and a penetration width of 0.15 mm was observed. Moreover, it can be seen from Table 1 that the impact resistance of each of Examples 4-6 is superior to Examples 1-3. Thus, it has been demonstrated that the retaining ring of the elastomeric material prepared from siloxane side-chain liquid crystal elastomer, polymerizable liquid crystalline monomer and photoinitiator can further improve the impact resistance of liquid crystal panels.

It should be understood that the above embodiments of the invention have been disclosed only for illustrating the principle of the present invention, but they are not intended to limit the present invention. Obviously, the person skilled in the art can make various modifications and variations of the invention without departing from the spirit and scope of the invention, thus the modifications and variations of the invention are included within the scope of the present invention.

The invention claimed is:

1. A color filter substrate comprising a sealant and a pixel area, characterized in that, a retaining ring is disposed between the sealant and the pixel area, wherein the retaining ring is prepared from a siloxane side-chain liquid crystal elastomer, or an elastomeric material prepared by subjecting a mixture of a siloxane side-chain liquid crystal elastomer, a polymerizable liquid crystalline monomer and a photoinitiator to UV irradiation to induce polymerization.

2. The color filter substrate according to claim 1, wherein a width of the retaining ring is in a range of 50 μm to 500 μm.

3. The color filter substrate according to claim 1, wherein a width of the retaining ring is in a range of 200 μm to 400 μm.

4. The color filter substrate according to claim 1, wherein the retaining ring does not contact the sealant or the pixel area.

5. The color filter substrate according to claim 4, wherein a distance of the inner edge of the retaining ring from the outer edge of the pixel area is in a range of 100 to 300 μm, and a distance of the outer edge of the retaining ring from the inner edge of the sealant is in a range of 50 to 200 μm.

6. The color filter substrate according to claim 1, wherein the retaining ring has a thickness in a range of 2.0 μm to 6.0 μm.

7. The color filter substrate according to claim 1, wherein the retaining ring is formed by UV irradiation after applying the mixture of the siloxane side-chain liquid crystal elastomer, the polymerizable liquid crystalline monomer and the photoinitiator to the color filter substrate in a region between the pixel area and the sealant area.

8. A liquid crystal panel which is prepared by assembling and aligning, under vacuum, an array substrate and a color filter substrate, wherein the color filter substrate comprises a sealant and a pixel area, characterized in that, a retaining ring is disposed between the sealant and the pixel area, wherein the retaining ring is prepared from a siloxane side-chain liquid crystal elastomer, or an elastomeric material prepared by subjecting a mixture of a siloxane side-chain liquid crystal elastomer, a polymerizable liquid crystalline monomer and a photoinitiator to UV irradiation to induce polymerization.

9. The color filter substrate according to claim 1, wherein the elastomeric material is prepared by subjecting a mixture of a siloxane side-chain liquid crystal elastomer, a polymerizable liquid crystalline monomer and a photoinitiator to UV irradiation to induce polymerization.

10. The color filter substrate according to claim 9, wherein the siloxane side-chain liquid crystal elastomer has a network structure comprising both a polysiloxane backbone and a liquid crystal unit-containing side chain, and the elastomeric material has a network structure.

11. The color filter substrate according to claim 10, wherein the siloxane side-chain liquid crystal elastomer has a structure represented by the following formula:

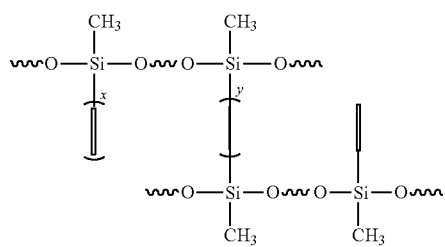

wherein:

— represents:

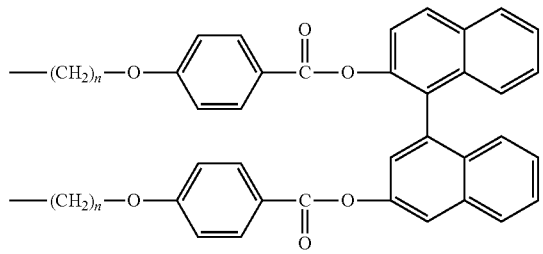

⇌ represents:

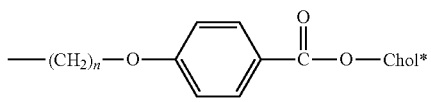

wherein:

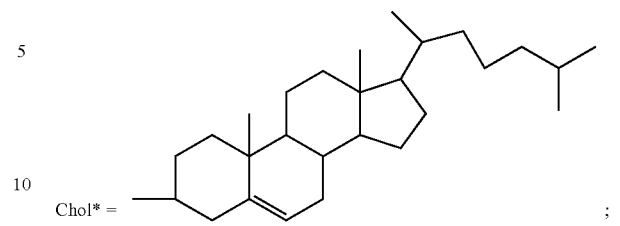

and wherein n represents an integer in a range of 3-15, and a ratio of x:y is in a range of 1:9-9:1.

12. The color filter substrate according to claim 9, wherein the polymerizable liquid crystalline monomer is 1,4-bis(4-(6'-acryloxy hexyloxy)benzoyloxy)-2-toluene.

13. The color filter substrate according to claim 9, wherein the photoinitiator is benzil dimethyl ketal.

14. The color filter substrate according to claim 9, wherein the siloxane side-chain liquid crystal elastomer presents at an amount of 79% or more, the polymerizable liquid crystalline monomer presents at an amount of 20% or less, and the photoinitiator presents at an amount of 1% or less, based on the total mass of the siloxane side-chain liquid crystal elastomer, the polymerizable liquid crystalline monomer and the photoinitiator.

15. The color filter substrate according to claim 9, wherein the siloxane side-chain liquid crystal elastomer presents at an amount of 89-95%, the polymerizable liquid crystalline monomer presents at an amount of 5-10%, and the photoinitiator presents at an amount of 0.25-0.5%, based on the total mass of the siloxane side-chain liquid crystal elastomer, the polymerizable liquid crystalline monomer and the photoinitiator.

16. The color filter substrate according to claim 9, wherein the conditions of the UV irradiation includes: an irradiation intensity in a range of 5-10 mW/cm$^2$, a temperature in a range of 20-100° C., and a duration of irradiation in a range of 30-60 minutes.

17. The color filter substrate according to claim 16, wherein the temperature is in a range of 20-40° C.

* * * * *